United States Patent
Kim et al.

(10) Patent No.: US 9,603,092 B2
(45) Date of Patent: Mar. 21, 2017

(54) **POWER SAVINGS WITH PREAMBLE IN *WLAN* SYSTEMS**

(71) Applicant: Apple Inc., Cupertino, CA (US)

(72) Inventors: Joonsuk Kim, Saratoga, CA (US); Syed A. Mujtaba, Santa Clara, CA (US); Xiaowen Wang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 113 days.

(21) Appl. No.: 14/138,659

(22) Filed: Dec. 23, 2013

(65) Prior Publication Data

US 2015/0071142 A1  Mar. 12, 2015

Related U.S. Application Data

(60) Provisional application No. 61/877,015, filed on Sep. 12, 2013.

(51) Int. Cl.
*H04L 12/28* (2006.01)
*H04L 12/56* (2006.01)
*H04W 52/02* (2009.01)

(52) U.S. Cl.
CPC ......... *H04W 52/0238* (2013.01); *Y02B 60/50* (2013.01)

(58) Field of Classification Search
CPC .................... H04W 52/0238; Y02B 60/50
USPC .......................... 370/311, 328, 393
See application file for complete search history.

(56) References Cited

U.S. PATENT DOCUMENTS

| | | | | |
|---|---|---|---|---|
| 2005/0060418 A1* | 3/2005 | Sorokopud | ............. | H04L 47/22 709/230 |
| 2010/0260159 A1* | 10/2010 | Zhang | ................... | H04W 28/06 370/338 |
| 2011/0032875 A1* | 2/2011 | Erceg | ................... | H04B 7/0452 370/328 |
| 2011/0194475 A1* | 8/2011 | Kim | ...................... | H04L 1/0053 370/311 |

(Continued)

OTHER PUBLICATIONS

Mahmoud Taghizadeh et al. "Collaborative Firewalling in Wireless Networks." IEEE. 2011 See abstract and section 1.

(Continued)

*Primary Examiner* — Chuong T Ho
(74) *Attorney, Agent, or Firm* — Sterne, Kessler, Goldstein and Fox P.L.L.C.

(57) ABSTRACT

In order to reduce power consumption of an electronic device during communication with another electronic device in a wireless local area network (WLAN), the electronic device analyzes fields in a given packet prior to a payload of the given packet to look for information that specifies a destination of the given packet. For example, the information may include: a full associated identification (AID) of the destination, a partial media-access-control (MAC) address of the destination; and/or a compressed (MAC) address of the destination. The information may be included in the preamble of the given packet. In particular, the information may replace length information in a high-throughput signal field in the given packet. Moreover, if the destination is other than the electronic device, the electronic device dumps the given packet and changes a power state of the electronic device, thereby reducing the power consumption.

19 Claims, 6 Drawing Sheets

(56) References Cited

U.S. PATENT DOCUMENTS

| | | | |
|---|---|---|---|
| 2011/0214037 A1* | 9/2011 | Okamura | H03M 13/116 |
| | | | 714/777 |
| 2013/0128807 A1* | 5/2013 | Vermani | H04L 5/0053 |
| | | | 370/328 |
| 2013/0195001 A1 | 8/2013 | Liu | |
| 2015/0124794 A1* | 5/2015 | Hansen | H04B 7/02 |
| | | | 370/338 |
| 2016/0119815 A1* | 4/2016 | Liu | H04L 1/06 |
| | | | 370/329 |

OTHER PUBLICATIONS

MD. Kamrul Hasan et al. "IEEE 802.11b Packet Analysis to improve Network Performance." JU Journal of Information Technology (JIT), vol. 1, Jun. 2012. See abstract , pp. 27-28 and p. 30.
EXTRICOM. "802.11n for Enterprise Wireless LANs." <URL,:www.extricom.com>, 2010. See pp. 7-9.
English Translation of Office Action, issued Dec. 31, 2015, for Taiwan Patent Application No. 103131425, 7 pages.

* cited by examiner

POWER SAVINGS WITH PREAMBLE IN WLAN SYSTEMS

CROSS REFERENCE TO RELATED APPLICATION

This application claims priority under 35 U.S.C. §119(e) to U.S. Provisional Application Ser. No. 61/877,015, entitled "Power Savings with Preamble in WLAN Systems," by Joonsuk Kim, Syed A. Mujtaba, and Xiaowen Wang, filed on Sep. 12, 2013, the contents of which are herein incorporated by reference.

BACKGROUND

Field

The described embodiments relate to techniques for reducing power consumption of electronic devices in a wireless network.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 communication protocol or Bluetooth™ from the Bluetooth Special Interests Group of Kirkland, Wash.), and/or another type of wireless interface.

When there are multiple electronic devices wirelessly communicating with each other in wireless local area network (WLAN), an electronic device may receive multiple packets that have a different destination than the electronic device (i.e., which are not relevant to the electronic device). However, in order to determine the destination of a packet, the networking subsystem typically decodes the entire packet.

For example, in the IEEE 802.11n communication protocol, the destination of the packet is specified by the machine-access-code (MAC) address in the payload after the preamble. Therefore, in order to determine the destination of the packet in this example, the networking subsystem typically needs to decode the packet all the way through to the error-detection information (in a so-called CRCd field), so that the networking subsystem can confirm that the destination has been decoded correctly.

Because this decoding effort occurs even when the packet has a different destination, significant power may be needlessly consumed by the networking subsystem. This power consumption reduces the operating time of the electronic device, which can frustrate users and degrade the user experience.

SUMMARY

The described embodiments include an electronic device. This electronic device includes: an antenna; and a receive circuit, coupled to the antenna, which receives packets from another electronic device using a wireless local area network (WLAN), such as a WLAN compatible with an Institute of Electrical and Electronics Engineers (IEEE) 802.11 communication protocol. This receive circuit analyzes fields in a given packet prior to a payload of the given packet to look for information that specifies a destination of the given packet. Moreover, the electronic device includes control logic coupled to the receive circuit. If the destination is other than the electronic device, the control logic dumps the given packet and changes a power state of the electronic device.

For example, the information may include: a full associated identification (AID) of the destination, a partial media-access-control (MAC) address of the destination; and/or a compressed (MAC) address of the destination. The information may be included in the preamble of the given packet. In particular, the information may replace length information in a high-throughput signal field in the given packet.

Note that changing the power state may reduce power consumption of the electronic device.

In some embodiments, the given packet includes information specifying a proprietary format that is compatible with an IEEE 802.11 communication protocol and avoids interference with other electronic devices in the wireless local area network. For example, the information specifying the proprietary format includes: a proprietary bit in a signal-training field, a proprietary bit in a high-throughput signal field, and/or a type of encoding of the information specifying the destination of the given packet.

Another embodiment provides the other electronic device that includes: an antenna; and a transmit circuit, coupled to the antenna, which transmits packets to the electronic device using the WLAN. This transmit circuit assembles the given packet with the information that specifies the electronic device located in the given packet prior to the payload of the given packet. Moreover, the information replaces length information in the high-throughput signal field in the given packet.

Note that the information facilitates reduced power consumption of the electronic device.

Another embodiment provides an integrated circuit that includes the receive circuit.

Another embodiment provides an integrated circuit that includes the transmit circuit.

Another embodiment provides a method for changing the power state of the electronic device. During the method, the electronic device receives packets from the other electronic device using the WLAN. For the given packet, the electronic device analyzes fields prior to the payload of the given packet to look for the information that specifies the destination of the given packet. If the destination is other than the electronic device, the electronic device dumps the given packet and changes the power state of the electronic device.

DETAILED DESCRIPTION

In order to reduce power consumption of an electronic device during communication with another electronic device in a wireless local area network (WLAN), the electronic device analyzes fields in a given packet prior to a payload of the given packet to look for information that specifies a destination of the given packet. For example, the information may include: a full associated identification (AID) of the destination, a partial media-access-control (MAC) address of the destination; and/or a compressed (MAC) address of the destination. The information may be included in the preamble of the given packet. In particular, the information may replace length information in a high-throughput signal field in the given packet. Moreover, if the destination is other than the electronic device, the electronic device dumps the given packet and changes a power state of the electronic device, thereby reducing the power consumption.

For example, packets that are transmitted and received by radios in the electronic devices in accordance with a communication protocol, such as an Institute of Electrical and Electronics Engineers (IEEE) 802.11 communication protocol or standard, Bluetooth™ (from the Bluetooth Special Interests Group of Kirkland, Wash.), and/or another type of wireless interface. In the discussion that follows, IEEE 802.11 (such as Wi-Fi) is used as an illustrative example.

Figure 1:
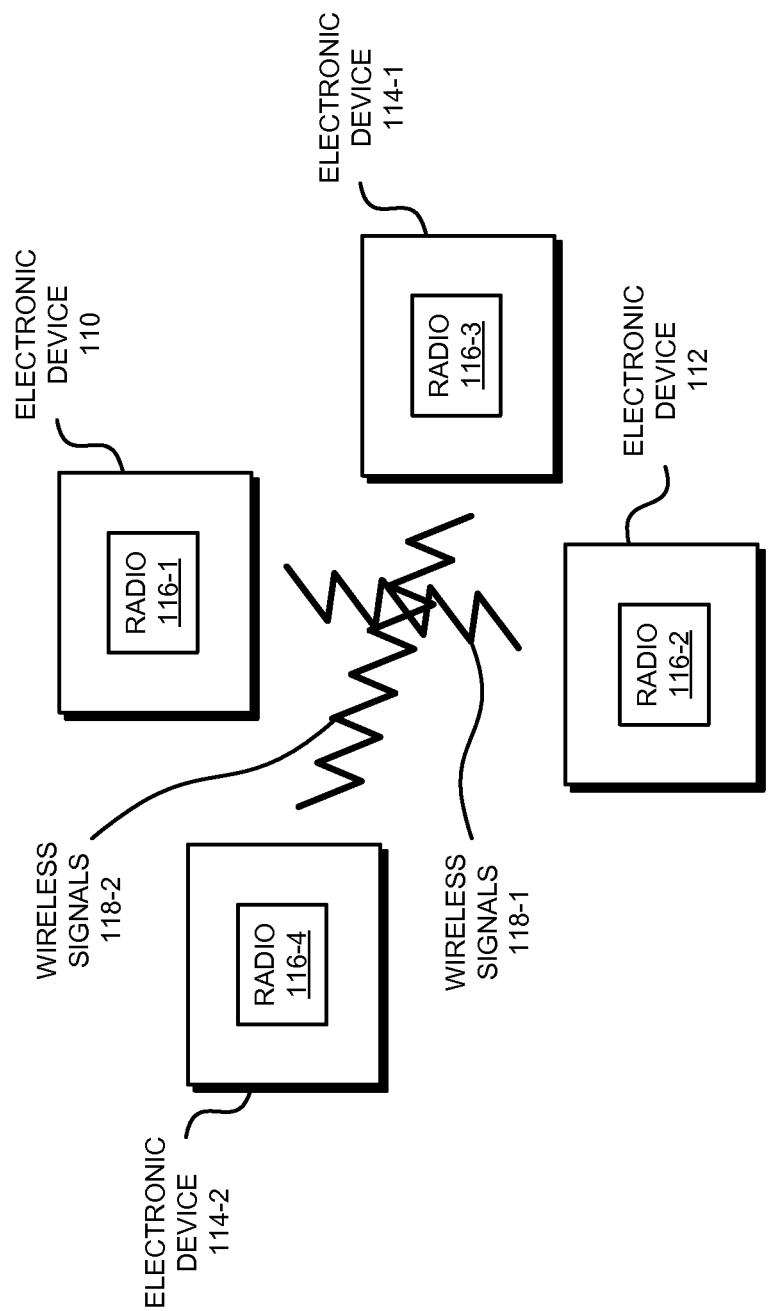
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 and 112 wirelessly communicating in a WLAN. In particular, these electronic devices may wirelessly communicate while: discovering one another by scanning wireless channels, transmitting and receiving advertising frames on wireless channels, establishing connections (for example, by transmitting connect requests), and/or transmitting and receiving packets (which may include the information and/or payloads). The WLAN may include one or more other electronic devices 114 that wirelessly communicate with other electronic devices in FIG. 1.

Figure 6:
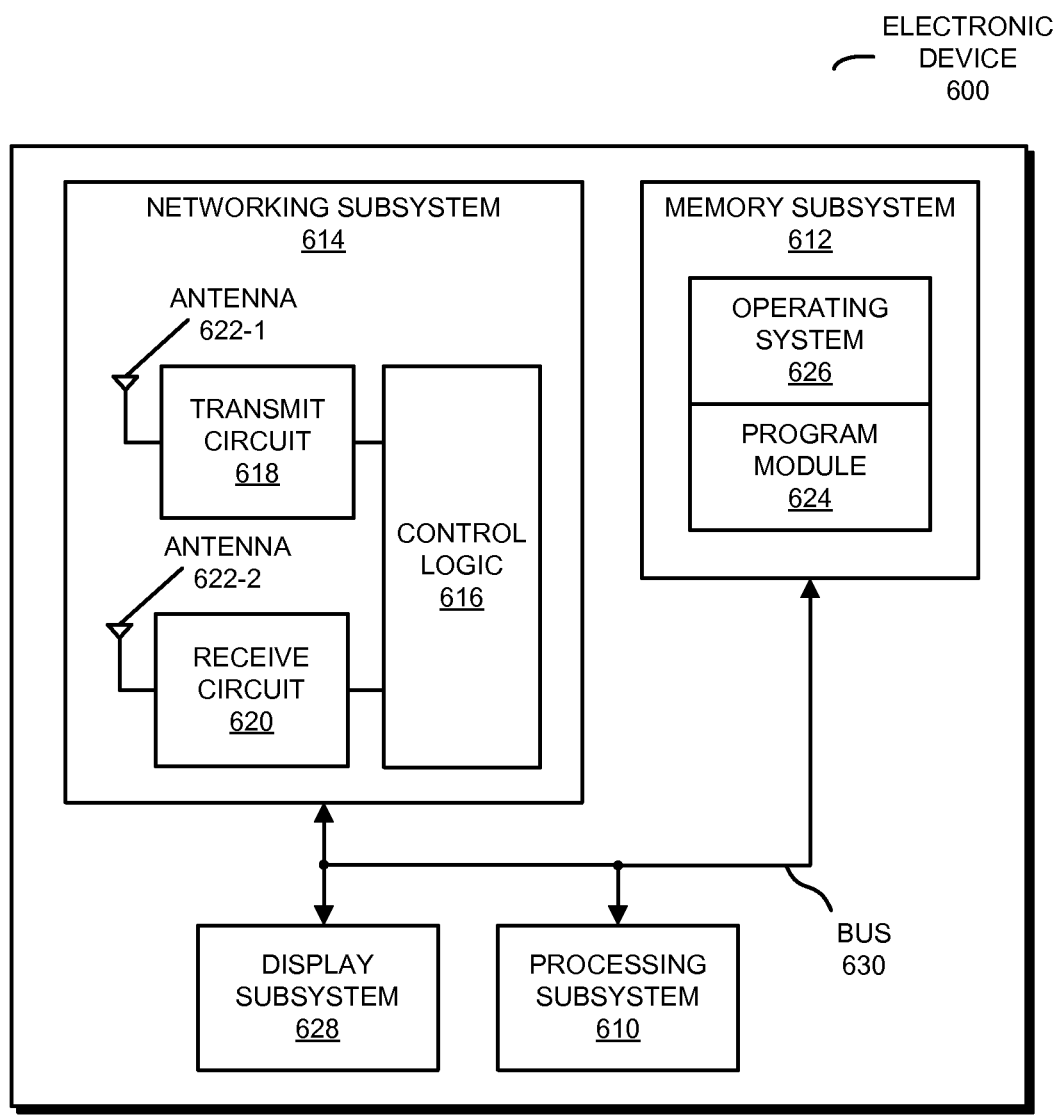
FIG. 6 is a block diagram illustrating one of the electronic devices of FIG. 1 in accordance with an embodiment of the present disclosure.

As described further below with reference to FIG. 6, electronic devices 110, 112 and 114 may include subsystems, such as a networking subsystem, a memory subsystem and a processor subsystem. In addition, electronic devices 110 and 112 may include radios 116 in the networking subsystems. More generally, electronic devices 110 and 112 can include (or can be included within) any electronic devices with the networking subsystems that enable electronic devices 110 and 112 to wirelessly communicate with another electronic device. This can comprise transmitting advertising frames on wireless channels to enable electronic devices to make initial contact, followed by exchanging subsequent data/management frames (such as connect requests) to establish a connection, configure security options, transmit and receive packets or frames via the connection, etc.

As can be seen in FIG. 1, wireless signals 118-1 (represented by jagged lines) are transmitted from a radio 116-1 in electronic device 110. These wireless signals are received by radio 116-2 in electronic device 112. Similarly, wireless signals 118-2 may be transmitted from a radio 116-3 in electronic device 114-1. These wireless signals are received by radio 116-4 in electronic device 114-2. Note that when electronic device 110 sends a packet to electronic device 112, other electronic devices, such as electronic devices 114, also try to detect/decode the packet because they do not know the destination of the packet beforehand (and vice versa).

In the described embodiments, processing a packet or frame in a given electronic device (such as one of electronic devices 110, 112 and 114) includes: receiving wireless signals 118 with the packet or frame; decoding/extracting the packet or frame from received wireless signals 116; acquire the packet or frame; and processing the packet or frame to determine information contained in the packet or frame. For example, the given electronic device may determine a destination of the packet or frame using information in the packet or frame that precedes the payload. If the destination is other the given electronic device, the electronic device may dump the packet or frame without processing the payload and may change a power state of the given electronic device. Otherwise, the electronic device may complete processing of the payload. In this way, the power consumption of electronic device 112 may be significantly reduced if packets communicated between electronic devices 114 are received by electronic device 112, while allowing the communication between electronic devices 110 and 112 to proceed.

Figure 3:
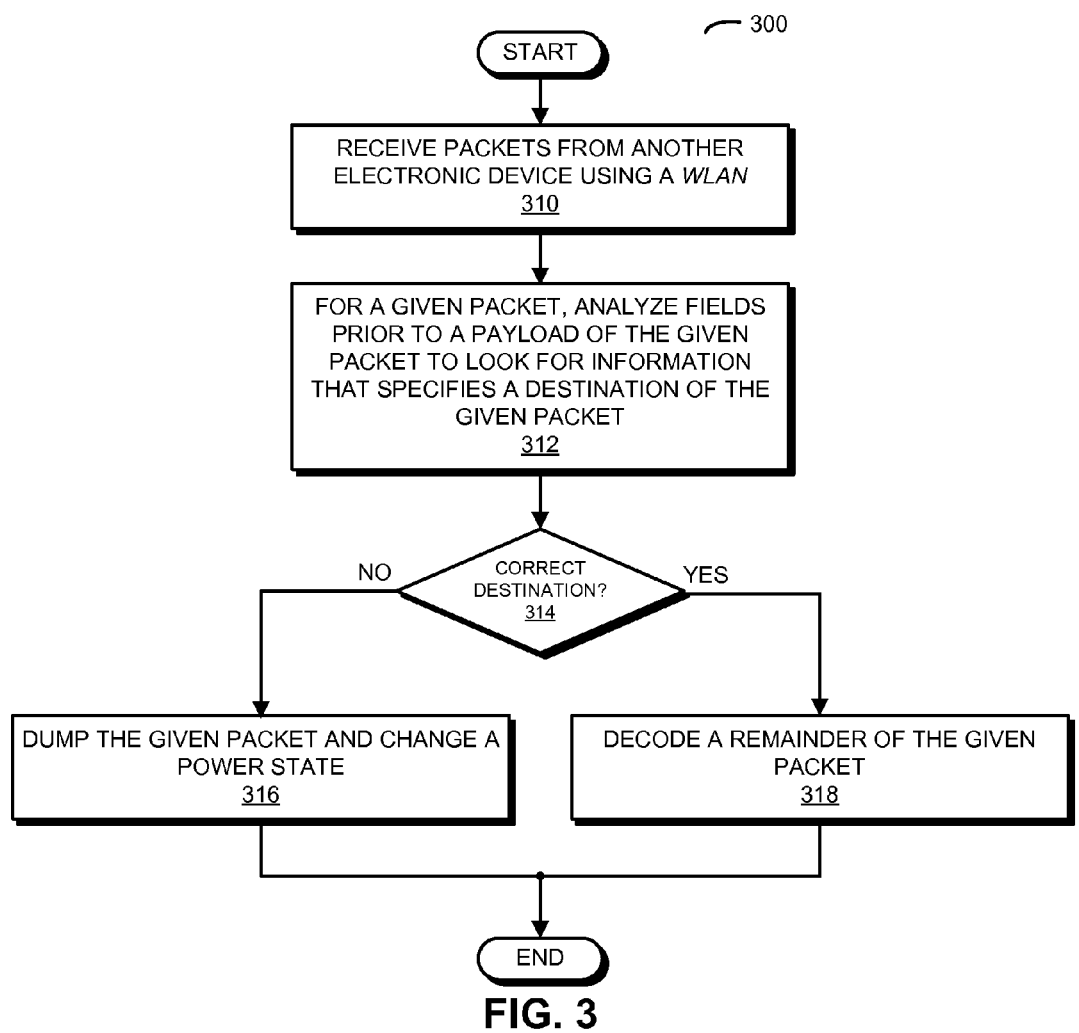
FIG. 3 is a flow diagram illustrating a method for changing a power state of one of the electronic devices of FIG. 1 in accordance with an embodiment of the present disclosure.

For example, the information may include: a full associated identification (AID) of the destination (which is assigned to a given electronic device in a cell in the WLAN in FIG. 1), a partial media-access-control (MAC) address of the destination (such as a sufficient portion of the MAC address to specify one of electronic devices 110, 112 and 114); and/or a compressed (MAC) address of the destination (such as a one-way hash of the MAC address, only even MAC-address bits, only odd MAC-address bits, etc.). The information may be included in the preamble of a given packet. In particular, as described below with reference to FIG. 3, the information may replace length information in a high-throughput signal field in the given packet (such as an HT-SIG1 field).

In the described embodiments, processing a packet or frame in a given electronic device (such as one of electronic devices 110, 112 and 114) includes: receiving wireless signals 118 with the packet or frame; decoding/extracting the packet or frame from received wireless signals 118; acquire the packet or frame; and processing the packet or frame to determine information contained in the packet or frame. For example, the given electronic device may determine a destination of the packet or frame using information in the packet or frame that precedes the payload. If the destination is other the given electronic device, the electronic device may dump the packet or frame without processing the payload and may change a power state of the given electronic device. Otherwise, the electronic device may complete processing of the payload. In this way, the power consumption of electronic device 112 may be significantly reduced if packets communicated between electronic devices 114 are received by electronic device 112, while allowing the communication between electronic devices 110 and 112 to proceed.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
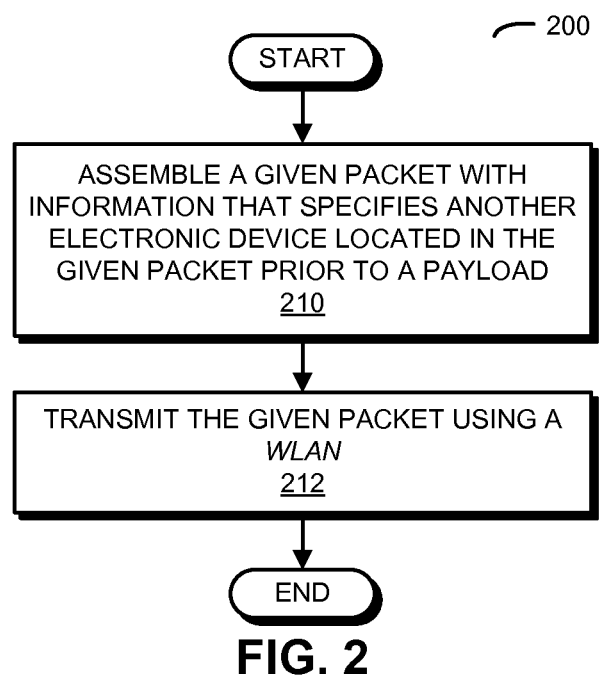
FIG. 2 is a flow diagram illustrating a method for transmitting a packet performed by one of electronic devices in FIG. 1 in accordance with an embodiment of the present disclosure.

FIG. 2 presents a flow diagram illustrating a method 200 for transmitting a packet performed by one of electronic devices in FIG. 1, such as electronic device 110. During operation, the electronic device assembles a given packet with information that specifies another electronic device located in the given packet prior to a payload of the given packet (operation 210). This information replaces length information in a high-throughput signal field in the given packet and may specify the destination of the given packet. Then, the electronic device transmits the given packet using a WLAN (operation 210).

The given packet may be received by another electronic device. This is discussed in FIG. 3, which presents a flow diagram illustrating a method 300 for changing a power state of one of the electronic devices of FIG. 1, such as electronic device 112. During operation, the electronic device receives packets from another electronic device using a WLAN (operation 310). For a given packet, the electronic device analyzes fields prior to a payload of the given packet to look for information that specifies a destination of the given packet (operation 312). If the destination is other than the electronic device (operation 314), the electronic device dumps the given packet and changes a power state of the electronic device (operation 316). Otherwise (operation 314), the electronic device decodes a remainder of the given packet (operation 318).

In these ways, the electronic devices (for example, integrated circuits in the electronic devices) may facilitate the communication with significantly reduced power consumption. In particular, in FIG. 1 electronic device 112 may quickly determine the destination of the given packet, thereby allowing electronic device 112 to transition to a mode with reduced power consumption (such as a sleep mode) if the given packet has a different destination than electronic device 112. This determination may occur without requiring electronic device 112 to process the rest of the given packet (including the payload). Therefore, electronic device 112 does not need to remain in the active mode as long. Consequently, the power savings associated with this communication technique may be significant.

In some embodiments of methods 200 (FIG. 2) and 300, there may be additional or fewer operations. Moreover, the order of the operations may be changed, and/or two or more operations may be combined into a single operation.

In an exemplary embodiment, the communication technique allows a portable electronic device (i.e., a wireless client) to use Wi-Fi radio to quickly determine destinations of packets and to use this to manage power consumption of the portable electronic device. In particular, using the IEEE 802.11n communication protocol as an example, the preamble of a packet may be modified to include a partial MAC address of the destination of the packet. By utilizing this information in the preamble during communication based on the IEEE 802.11n communication protocol, a receive circuit in another electronic device can identify the destination of the packet, even before decoding the whole physical payload. This enables one or more electronic devices (which are sometimes referred to as 'stations') that received the packet to drop the packet and to transition to a sleep mode sooner than other legacy stations that do not include this capability in their receive circuits. Moreover, this communication technique reduces power consumption at the receiver in a WLAN, which results in better battery life and/or a simpler state-machine transition in the receive circuit. Note that while IEEE 802.11n is used as an illustration in the discussion that follows, the communication technique can be applied to other communication protocols, such as IEEE 802.11ac or another IEEE 802.11 communication protocol.

In the existing packet format for IEEE 802.11n, the preamble includes: a legacy short-training field (L-STF), a legacy long-training field (L-LTF), a legacy signal-training field (L-SIG), a high-throughput signal field 1 (HT-SIG1), a high-throughput signal field 2 (HT-SIG2), error detection for the signal fields (CRCs), a high-throughput short-training field (HT-STF), and a high-throughput long-training field (HT-LTF). The preamble is followed by the data in a Payload 1 field (which includes the MAC address), other Payload fields (2 to N) (where N is variable that depends on the data length), and error detection for the data (CRCd). Similarly, in the existing packet format for IEEE 802.11ac, the preamble fields include: the L-STF, the L-LTF, the L-SIG, a very high-throughput signal field 1 (VHT-SIG1), a very high-throughput signal field 2 (VHT-SIG2), CRCs, a very high-throughput short-training field (VHT-STF), a very high-throughput long-training field (VHT-LTF), and a very high-throughput, signal-field type B (VHT-SIGB). The preamble is followed by the data in a Payload 1 field (which includes the MAC address), other Payload fields (2 to N), and CRCd.

Note that the signal fields has a separate CRCs to check for decoding errors in control signals, such as MCS, LENGTH, bandwidth and the coding techniques used. In addition, the physical payload field includes a MAC header and MAC data, followed by CRCd. The MAC header includes the recipient MAC address, where the destination of the packet is revealed. However, until CRCd is checked, a receive circuit cannot confirm if the destination of the packet it decoded is correct or not. Therefore, the receive circuit has to decode the packet all the way to CRCd even if it is not the destination of the packet.

When there can be many stations (or electronic devices) communicating in a base station or cell, each station (and their associated receive circuits) may experience many packet exchanges that are not relevant (i.e., which have a different destination). However, in many approaches the station has to decode all the packets. An improved approach would be to drop irrelevant packets right after the physical Payload 1 field. Regardless CRCd, if the decoded MAC address does not match that of the station or electronic device, then it is not the destination of the packet. In the present communication technique, information is included in the preamble of the packet before the payload so that the receive circuit in the electronic device can identify the destination of the packet in advance and, if appropriate, can drop the packet right away, without decoding all the packets. The power saving associated with such early dropping of the packet can be significant.

Figure 4:
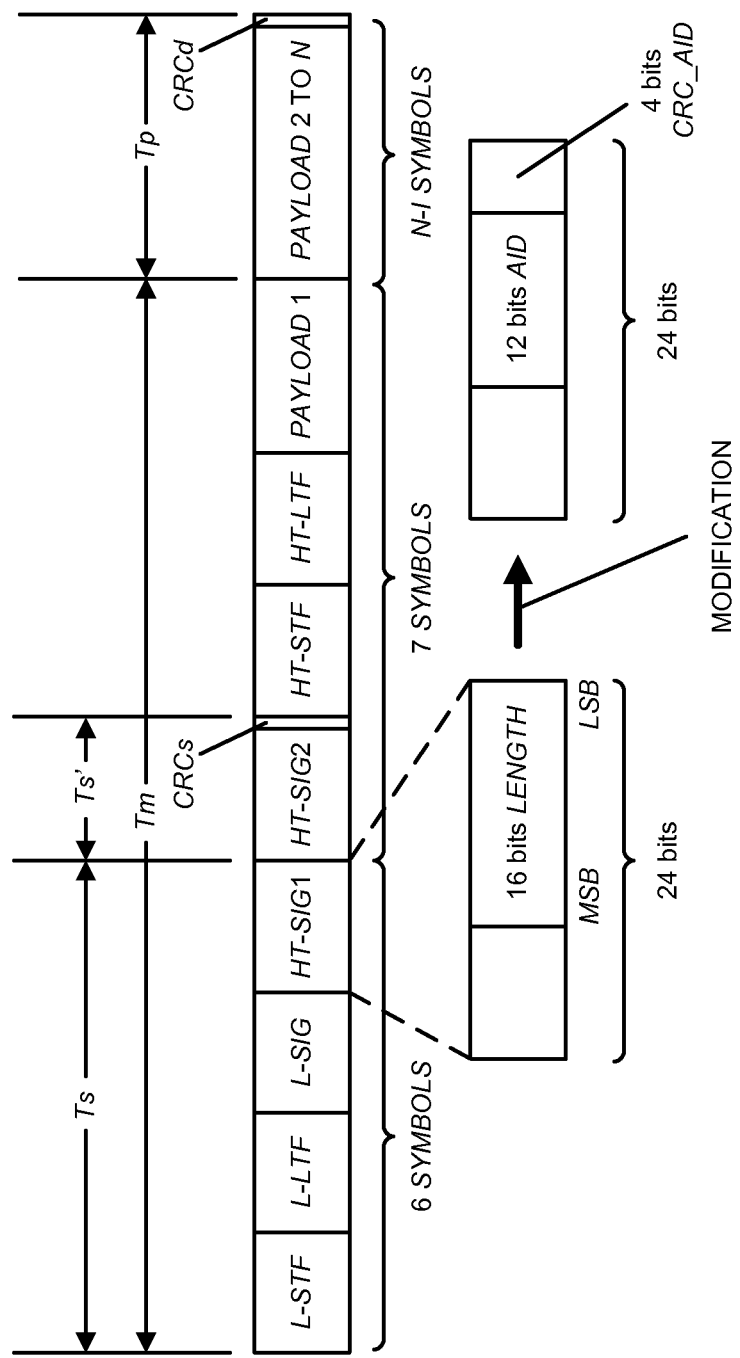
FIG. 4 is a drawing illustrating a packet structure in the wireless communication in FIG. 1 in accordance with an embodiment of the present disclosure.

The modifications to the packet format of 802.11n are shown in FIG. 4, which presents a drawing illustrating a packet structure in the wireless communication in FIG. 1. In this example, the number of spatial streams Nss (i.e., the number of antennas) is four and there are N data symbols. Consequently, there are four instances of the HT-LTF field. In general, Nss is equal to or greater than one.

As shown in FIG. 4, the LENGTH bits are included in the L-SIG and the HT-SIG1 fields. Consequently, the 16 LENGTH bits in the HT-SIG1 field can be replaced with 12 associated identifier (AID) bits (which is a shortened form of the destination in comparison with the 48-bit MAC address that is assigned to the electronic device by a base station when an electronic device joins a cell) and four error detection (CRC_AID) bits (which provide additional protection for the 12 AID bits). The remainder of the bits in the HT-SIG1 field may remain the same as in the original specification for the IEEE 802.11n communication protocol. Note that the HT-SIG2 field has one reserved bit. This bit can be used to indicate that LENGTH bits in the HT-SIG1 field are used to convey the AID bits for the proprietary solution in the communication technique. As described further below, a receive circuit can identify whether or not it is the destination of a packet at the HT-SIG1 field. Therefore, in electronic devices that use this proprietary solution, the LENGTH information is obtained from the L-SIG field, as opposed to the HT-SIG field. Note that a similar approach can be used in the packet format or structure associated with the IEEE 802.11ac communication protocol.

The reasoning behind the disclosed proprietary modification to the IEEE 802.11n preamble is as follows. The LENGTH field or bits are used to indicate the packet length to all stations, regardless of whether or not they are recipients of the packet. If the packet is not intended for a particular station, using the information in the preamble the station can drop the packet in the middle of decoding process and sleep for the time duration (which was indicated by LENGTH) until the packet transmission finishes. Note that it may still be useful for the station to decode the LENGTH field or bits, even if the station is not the recipient of the packet. Thus, the LENGTH information is in the preamble, which is decoded before the station goes to sleep.

The LENGTH information in the HT-SIG1 field is replaced for the IEEE 802.11n communication protocol in the communication technique, because the L-SIG field includes the LENGTH field (which also has 12 bits) that is used for the same purpose (indicating the packet length). Note that the L-SIG filed LENGTH information represents the number of bytes with 6 Mbps, while the HT-SIG field LENGTH information represents the number of bytes with the data rate of the packet. Thus, the time equals $8 \cdot \text{LENGTH}_{L\text{-}SIG}/6$ Mbps, which equals $8 \cdot \text{LENGTH}_{HT\text{-}SIG}/\text{data rate}_{HT}$. Consequently, the LENGTH information in the L-SIG field can be used in the proprietary packet format or structure in the communication technique. Electronic devices that use the communication technique operate in the same way as other electronic devices that use the IEEE 802.11n communication protocol. However, only the electronic devices that can decode the proprietary packet format or structure in the communication technique (which is compatible with the IEEE 802.11n communication protocol) get the benefits of early detection of the packet destination. As described further below, the communication technique can save around 50% of the power consumption, compared to electronic devices that use the existing IEEE 802.11n communication protocol.

A variety of techniques may be used to indicate whether (or not) a packet uses the proprietary structure or format of the communication technique. For example, a reserve bit may be used in the L-SIG field and/or the HT-SIG2 field. Alternatively or additionally, blind detection may be used, or the HT-SIG1 field may be decoded in both ways (i.e., assuming that the information is either the LENGTH bits or the AID bits).

In some embodiments, 12-bit AID is encoded differently than in legacy electronic devices (i.e., those than do not use the communication technique). For example, when binary phase-shift keying is used, the encoding of the 12-bit AID may be rotated by 90°, which may signaling that the packet has a modified (proprietary) preamble. Legacy electronic devices may be unable or may fail to decode, thereby dropping the packet, while electronic devices that use the proprietary communication technique may understand or decode the modified preamble. Moreover, the decoding information may be used to check whether or not to drop the packet earlier.

Figure 5:
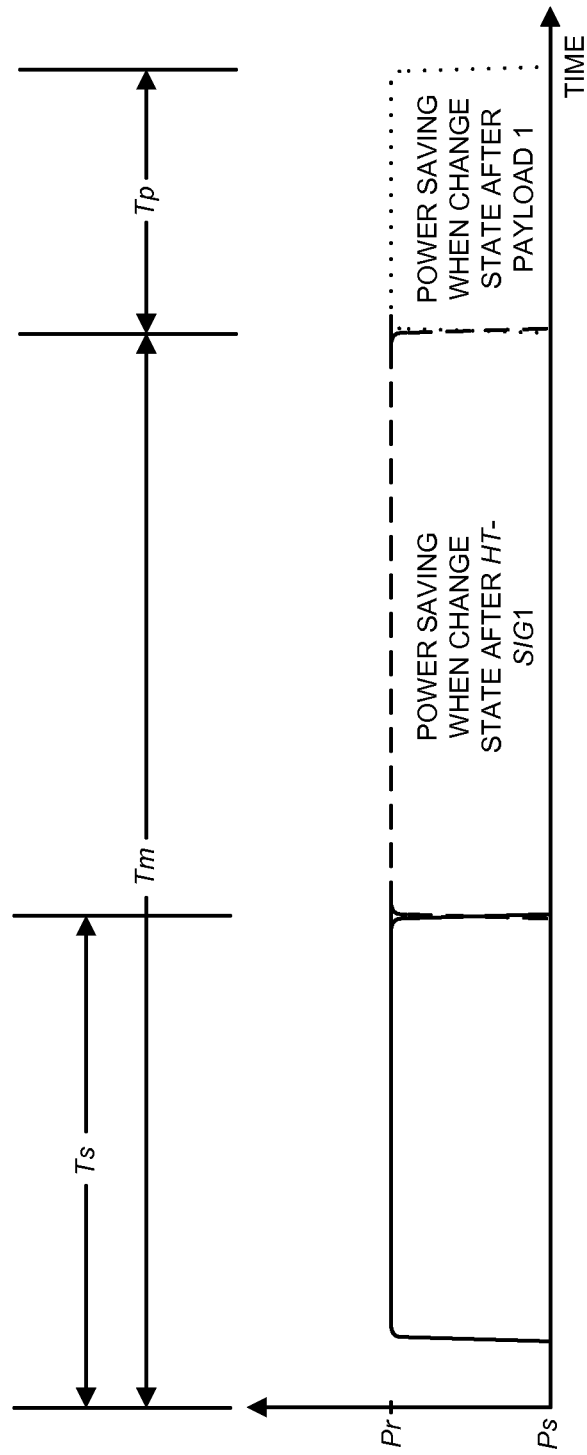
FIG. 5 is a timing diagram illustrating reduced power consumption of one of the electronic devices in FIG. 1 in accordance with an embodiment of the present disclosure.

Power savings using early detection of the destination is illustrated in FIG. 5, which presents a timing diagram illustrating reduced power consumption of one of the electronic devices in FIG. 1. Typically, in a legacy electronic device a non-designated packet may be dropped either at the end of the packet or after Payload 1, where the receive circuit in the legacy electronic device can decode the destination address of the packet. If such information is located in the preamble, non-designated packets can be dropped earlier. Assuming different power levels in different modes of the electronic device (such as a processing power of Pr in an active mode, and a sleep power of Ps in a sleep mode), the power saving is approximately $(Tm-Ts) \cdot (Pr-Ps)$ if a packet is dropped after Payload 1 and $(Tm+Tp-Ts-Ts') \cdot (Pr-Ps)$ if a packet is dropped after CRCd.

For example, with Nss equal to four, a physical payload of six orthogonal frequency division multiplexing (OFDM) symbols long, and a ratio of Pr to Ps between 50-1000, the power saving is 20-40% when the number of stations in a cell (M) is less than five. Alternatively, when M is greater than 20, the power saving can be more than 50% compared to legacy electronic devices. Thus, the power saving can be significant when M is large and for long packets (Tp is large).

The disclosed communication technique can significantly improve the power efficiency in a WLAN, especially when there are many stations at the same channel. This communication technique can be used in proprietary electronic devices based on the IEEE 802.11n communication technique. Because the LENGTH information in the HT-SIG field is simply duplicate information of the LENGTH information in the L-SIG field, the physical hardware does not really need both instances to operate. In the communication technique, the LENGTH information in the HT-SIG field is converted into AID, which enables early dropping of irrelevant packets. The capability can be used in transmit circuits and receive circuits that implement the communication technique. In contrast, when a legacy chip set is used, the LENGTH information in the HT-SIG field may be encoded/decoded as the length information. In comparison with a typical legacy electronic device, the power saving rate can be up to 90%. Furthermore, in comparison with an approach in which a packet is dropped after Payload 1, the power saving rate is up to 50%. Note that the early detection in the communication technique does not kick in another decoding process for the physical payload, thereby simplifying the state-machine transition when it is not the destination of the packet.

We now describe embodiments of the electronic device. FIG. 6 presents a block diagram illustrating an electronic device 600, such as one of electronic devices 110 and 112 in FIG. 1. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, a transmit circuit 618, a receive circuit 620 and antennas 622. For example, networking subsystem 614 can include a Bluetooth™ networking system, a cellular networking system (e.g., a 6G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

In networking subsystem 614, transmit circuit 618 may assemble packets, and then transmit the packets to another electronic device using antenna 622-1. These packets may include information specifying the destination (the other electronic device) in fields preceding the payload or data in the packets. Furthermore, packets may be received from another electronic device using antenna 622-2 and receive circuit 620. Receive circuit 620 may analyze fields in a given packet prior to a payload of the given packet to look for the information that specifies a destination of the given packet. If the destination is other than electronic device 600, control logic 616 may dump the given packet and may change a power state of electronic device 600. Alternatively, the operations of dumping and changing the power state may be performed, in whole or in part, by receive circuit 620.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising frames and/or scanning for advertising frames transmitted by other electronic devices as described previously.

Within electronic device 600, processing subsystem 610, memory subsystem 612, and networking subsystem 614 are coupled together using bus 630. Bus 630 may include an electrical, optical, and/or electro-optical connection that the subsystems can use to communicate commands and data among one another. Although only one bus 630 is shown for clarity, different embodiments can include a different number or configuration of electrical, optical, and/or electro-optical connections between the subsystems.

In some embodiments, the electronic device includes a display subsystem 628 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a server, a media player (such as an MP5 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 600, in alternative embodiments, different components and/or subsystems may be present in electronic device 600. For example, electronic device 600 may include one or more additional processing subsystems 610, memory subsystems 612, networking subsystems 614, and/or display subsystems 628. Additionally, one or more of the subsystems may not be present in electronic device 600. In some embodiments, instead of separate antennas 622 there is a single antenna for transmitting and receiving wireless signals. Moreover, in some embodiments, electronic device 600 may include one or more additional subsystems that are not shown in FIG. 6. For example, electronic device 600 can include, but is not limited to, a data collection subsystem, an audio and/or video subsystem, an alarm subsystem, a media processing subsystem, and/or an input/output (I/O) subsystem. Also, although separate subsystems are shown in FIG. 6, in some embodiments, some or all of a given subsystem or component can be integrated into one or more of the other subsystems or component(s) in electronic device 600. For example, in some embodiments program module 624 is included in operating system 626.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with the IEEE 802.11 communication protocol or standard was used as an illustrative example, the described embodiments of the communication techniques may be used in a variety of network interfaces, including network interfaces that use a proprietary packet format. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least a portion of the communication technique may be implemented in a physical layer in the access point and/or the wireless client. Alternatively or additionally, program module 624 can be implemented in a file layer in an access point or in firmware in a wireless client.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna;
   a receive circuit, coupled to the antenna, configured to receive packets from another electronic device using a wireless local area network (WLAN), wherein the receive circuit is configured to analyze fields in a given packet prior to a payload of the given packet to look for information that specifies a destination of the given packet, wherein the fields are included in a preamble of the given packet, wherein the information replaces length information in a high-throughput signal field in the preamble of the given packet; and
   control logic coupled to the receive circuit, wherein, in response to determining the destination not being the electronic device, the control logic is configured to dump the given packet and to change a power state of the electronic device.

2. The electronic device of claim 1, wherein the WLAN is compatible with an Institute of Electrical and Electronics Engineers (IEEE) 802.11 communication protocol.

3. The electronic device of claim 1, wherein the information includes: a full associated identification (AID) of the destination, a partial media access control address of the destination, or a compressed media access control address of the destination.

4. The electronic device of claim 1, wherein to change the power state, the control logic is configured to reduce power consumption of the electronic device.

5. The electronic device of claim 1, wherein the given packet comprises information specifying a proprietary format compatible with an IEEE 802.11 communication protocol and avoids interference with other electronic devices in the WLAN.

6. The electronic device of claim 5, wherein the information specifying the proprietary format comprises: a proprietary bit in a signal-training field, a proprietary bit in a high-throughput signal field, or a type of encoding of the information specifying the destination of the given packet.

7. The electronic device of claim 1, wherein the destination of the given packet comprises a second electronic device, wherein the second electronic device is operable in 802.11n in the WLAN.

8. The electronic device of claim 1, wherein the information that specifies the destination of the given packet comprises a cyclic redundancy check code.

9. An electronic device, comprising:
   an antenna;
   a transmit circuit, coupled to the antenna, configured to transmit packets to another electronic device using a wireless local area network (WLAN), and
   wherein the transmit circuit is configured to assemble a given packet with information that specifies the another electronic device, wherein the information is in a preamble of the given packet prior to a payload of the given packet;
   wherein the information includes: a full associated identification (AID) of a destination, a partial media access control address of the destination, or a compressed media access control address of the destination; and
   wherein the information replaces length information in a high-throughput signal field in the preamble of the given packet.

10. The electronic device of claim 9, wherein the WLAN is compatible with an Institute of Electrical and Electronics Engineers (IEEE) 802.11 communication protocol.

11. The electronic device of claim 9, wherein the given packet comprises information specifying a proprietary format compatible with an IEEE 802.11 communication protocol and avoids interference with other electronic devices in the WLAN.

12. The electronic device of claim 9, wherein the information comprises a cyclic redundancy check code.

13. A method for changing a power state of an electronic device, wherein the method comprises:

receiving packets from another electronic device using a wireless local area network (WLAN);

for a given packet, analyzing, for the given packet, fields prior to a payload of the given packet to look for information that specifies a destination of the given packet, wherein the information replaces length information in a high-throughput signal field in a preamble of the given packet; and in response to the destination not being the electronic device, dumping the given packet and changing the power state of the electronic device.

14. The method of claim 13, wherein the WLAN is compatible with an Institute of Electrical and Electronics Engineers (IEEE) 802.11 communication protocol.

15. The method of claim 13, wherein the information includes: a full associated identification (AID) of the destination, a partial media access control address of the destination, or a compressed media access control address of the destination.

16. The method of claim 13, wherein the changing the power state comprises reducing power consumption of the electronic device.

17. The method of claim 13, wherein the given packet comprises information specifying a proprietary format compatible with an IEEE 802.11 communication protocol and avoids interference with other electronic devices in the WLAN.

18. The method of claim 13, wherein the information that specifies the destination of the given packet comprises a cyclic redundancy check code.

19. The method of claim 13, wherein the destination of the given packet is a second electronic device, wherein the second electronic device is operable in 802.11n in the WLAN.

* * * * *

UNITED STATES PATENT AND TRADEMARK OFFICE
CERTIFICATE OF CORRECTION

PATENT NO. : 9,603,092 B2  
APPLICATION NO. : 14/138659  
DATED : March 21, 2017  
INVENTOR(S) : Kim et al.

Page 1 of 1

It is certified that error appears in the above-identified patent and that said Letters Patent is hereby corrected as shown below:

In the Detailed Description:
Column 4, Line 10, "wireless signals 116;" should read --wireless signals 118;--.

Signed and Sealed this  
Seventeenth Day of April, 2018

Andrei Iancu  
*Director of the United States Patent and Trademark Office*